United States Patent [19]
Jones

[11] 3,903,690
[45] Sept. 9, 1975

[54] TURBOFAN ENGINE LUBRICATION MEANS

[75] Inventor: Carmen B. Jones, Oxford, Ohio

[73] Assignee: General Electric Company, Cincinnati, Ohio

[22] Filed: Feb. 22, 1974

[21] Appl. No.: 445,674

Related U.S. Application Data

[62] Division of Ser. No. 331,806, Feb. 12, 1973, Pat. No. 3,861,139.

[52] U.S. Cl. .......... 60/39.08; 60/39.16 R; 60/226 R; 184/6.11; 415/69; 415/112; 415/175
[51] Int. Cl.² ........................................... F02C 7/06
[58] Field of Search ........ 60/39.08, 226 R, 39.16 R; 184/6.11; 415/69, 111, 112, 175

[56] References Cited
UNITED STATES PATENTS

| | | | |
|---|---|---|---|
| 2,911,267 | 11/1959 | Small | 60/39.08 |
| 3,248,880 | 5/1966 | Hull et al. | 60/39.08 |
| 3,325,088 | 6/1967 | Keen et al. | 415/175 X |
| 3,325,088 | 6/1967 | Keen et al. | 60/39.08 |
| 3,514,943 | 6/1970 | Britt | 60/39.08 |
| 3,531,935 | 10/1970 | Poucher | 60/39.08 |
| 3,703,081 | 11/1972 | Krebs et al. | 60/39.08 |

Primary Examiner—William L. Freeh
Assistant Examiner—Robert E. Garrett
Attorney, Agent, or Firm—Derek P. Lawrence; Lee H. Sachs

[57] ABSTRACT

A turbofan engine is provided with a compressor and a turbine, all of the bladed stages of the turbine and substantially all of the bladed stages of the compressor being rotor stages. Adjacent rotor stages within the compressor and the turbine are relatively counterrotating. The engine has three independently rotatable shafts connecting respectively three sets of blades stages of the turbine with three sets of bladed stages of the compressor to form three engine spools. A bladed fan occupying an annular duct substantially surrounding the compressor is driven by the intermediate of the three spools and is disposed near the axial center of the compressor. A quarterstage inlet fan, disposed within the duct upstream of the first fan, is driven by the radially innermost shaft.

4 Claims, 2 Drawing Figures

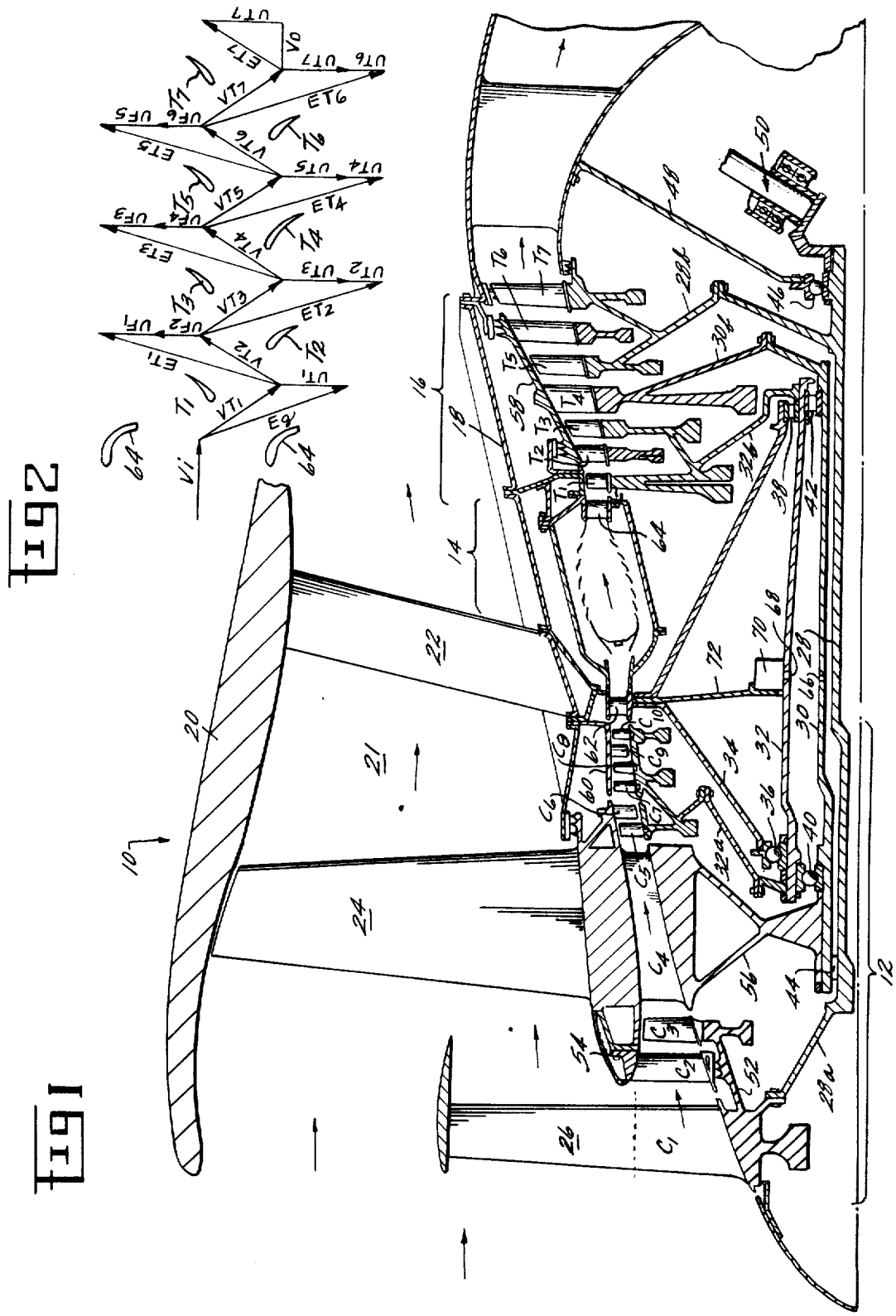

TURBOFAN ENGINE LUBRICATION MEANS

This is a divisional application of application Ser. No. 331,806, filed Feb. 12, 1973, now U.S. Pat. No. 3,861,139, and assigned to the assignee of the present invention.

BACKGROUND OF THE INVENTION

The present invention relates to gas turbine engines and, more particularly, to turbojet engines of the turbofan variety.

As the state of the art of gas turbine engines, and particularly such engines used to power aircraft, advances overall engine efficiency as well as engine weight are matters of primary concern. In the common situation, a gas turbine engine involves a compressor for performing work upon an incoming air flow and a turbine for extracting energy from an outgoing gas flow. Each of these includes a plurality of airfoil blades and comprises a good proportion of the overall weight of an engine. Hence, efforts toward increasing turbine and compressor efficiency as well as lessening their overall weights can reap substantial benefit.

In one particular variety of gas turbine engines, commonly referred to as turbofan engines, a fan driven by a portion of the turbine operates to compress and expel a flow of air without passing it through the core engine (including the compressor and turbine). Particularly with respect to subsonic operating engines, the fan element of turbofans provides a substantial portion of the thrust generated by an engine and, hence, improvements in fan efficiency will greatly enhance overall engine performance.

The present invention offers concepts and structure for substantially improving the overall efficiency both of compressors and turbines as well as fans. The invention suggests a high bypass ratio turbofan engine employing a three-spool layout. The direction of rotation of the three spools is so arranged as to provide counterrotation of adjacent blade rows within both the compressor and turbine components. The configuration is so chosen, and the design is so executed, as to provide a unique and advantageous matching of the high bypass ratio fan and its driving turbine.

In addition, the counterrotating rotor stages of the compressor and turbine forms substantially the entire configuration of each. In other words, substantially all stator stages are removed from the engine according to the present invention. With respect to the compressor, this means that no pressure rise occurs within the flowing gas except during passage through a rotor stage. In both compressors and turbines according to the prior art, stator vanes or nozzles perform a mere enabling function — that function being to direct the flow most efficiently into the downstream rotor blades. If this function can be performed by upstream rotor blades so that the stators can be eliminated, great weight saving will be a prime benefit. Furthermore, the absence of frictional shear losses and flow turning losses associated with present stators would substantially increase engine efficency. Concurrently, manufacture and maintenance of an engine having no stator sections would also benefit.

With respect to the fan, the present invention provides means to drive a high bypass (large radius) fan with a lightweight driving turbine having good performance, without undue compromise in either component, and without requiring a reduction gearbox.

The requirement for high blade speed (peripheral velocity) in a turbine design which seeks minimum weight through high stage loading (and thus fewer stages) may be illustrated as follows. Given a fixed change in momentum across any row of rotating buckets (and thus constant torque), then the power extraction varies linearly with blade speed. This statement neglects the fact that mass through-put must increase to maintain constant torque as blade speed increases, and thus must encounter a limitation as choking conditions impose a limit upon through-put.

From another viewpoint, an understanding can be achieved utilizing the concept of a fixed, near optimum ratio of blade speed to velocity of the flowing medium leaving the nozzle row (of a prior art rotor and stator combination) immediately forward of the row of rotating buckets being considered. The advantage of this conception or model for consideration of the turbine characteristics derives from the implication of similar velocity diagrams and stage efficiency for similar values of velocity ratio. Thus, increased blade speed will, for the case of constant velocity ratio, require a corresponding increase in "spouting velocity" or exit velocity from the lattice row immediately forward. When the rotating turbine blade row being considered is slowed to a tangential speed suitable to drive a high bypass fan, as under consideration in the present invention, the imposition of a constant velocity ratio criteria so compromises the flow angles as to create an awkward design and extract an efficiency penalty. With respect to the present invention, the freedom afforded by counterrotation and the capability of maintaining a reasonably high spouting velocity relative to the lattice row immediately upstream of the slowly rotating row of turbine buckets driving the fan restores a reasonable flow angle in the turbine and allows design of a highly loaded stage with attractive efficiency, despite the relatively low blade speed of those lattice rows employed to extract energy to drive the fan.

A contemporaneous and further design problem arising in conventional rotor and stator combinations is rooted in the inevitable torque transmitted to the associated engine casing and airplane due to unidirectional rotor motion. Such torque places a further installation requirement upon airplanes employing conventional engines due to gyroscopic maneuver loads. By applying principles of counterrotation, the present invention provides a solution to both efficiency and gyroscopic maneuver load problems while relieving aerodynamic loading problems, as will be described hereinafter.

It has already been suggested that turbines associated with fans may be restricted in blade speeds. A further significant consideration relative to the driving of the fan of a turbofan engine is that turbofans employing high bypass ratios (that is, an engine wherein the ratio of the quantity of air passing through the annular fan duct is large relative to the quantity of air passing into the compressor) have been found to be most efficient at subsonic flight speeds and to create less objectionable noise at relatively low fan blade speeds as compared to the higher compressor blade speeds that enable a high stage loading design in the core compressor. This consideration enhances the desirability of low fan blade speeds, but aggravates problems of fan-associated compressor pressure ratio capability and of fan-associated turbine stage efficiency; for, as stated, attainment of a useful pressure rise within a reasonable number of stages requires high compressor blade speeds relative to the air being compressed, and high turbine efficiency likewise has required high wheel speeds.

These concurrent considerations would appear to negate the usefulness of the conventional driving of the fan and compressor by means of a common shaft. Rather, there would appear to be cause for the adoption of a reduction gearbox allowing fan RPM and the RPM of the associated turbine and compressor to be independently selected. But the inherent weight, heat generated, and unreliability of such a gearbox negates or seriously compromises its advantages.

As an alternative attempt to solve the same problem, some prior art turbofan engines have incorporated a turbine separate from that used to drive the compressor, and have assigned to this turbine only the task of driving the fan. Clearly, the cost and weight of this second turbine minimize its desirability. The present invention contemplates the driving of the fan without the addition of a reduction gearbox, and in a way which improves overall efficiency of the engine as well.

By replacing the stator stages in the turbine and compressor with counterrotating rotor stages carried by the same shaft which drives the fan, the present invention increases pressure drop possible across individual turbine stages and enables a more compact compressor of reduced weight by increasing relative rotational velocities of adjacent stages and concurrently allows desirable lower fan speeds. This is accomplished by utilizing the intermediate of three coaxial shafts of the turbofan engine of the present invention to drive the fan and preselected blades stages of the compressor. This shaft is itself driven by turbine stages disposed between adjacent and counterrotating turbine stages driving the first and third shafts. Thus, the efficiencies of the fan, compressor and turbine are increased in a way which relieves their previously competing interests. More particularly, selected compressor and turbine stages can be rotated at high relative velocities while desirable low fan speeds are maintained.

SUMMARY OF THE INVENTION

It is, therefore, an object of the present invention to provide a gas turbine engine with improved turbine and compressor efficiencies and torque balance characteristics by the substantial elimination of stators within the turbine and compressor, and the substitution therefor of counterrotating rotor members.

It is another object of the present invention to provide a turbofan engine with improved fan efficiency and noise characteristics by reducing fan speed without detrimentally affecting efficiency of the turbine driving that fan and without compromising engine weight.

It is a further object of the present invention to provide a turbofan engine having improved torque balance characteristics by the provision for an inlet quarterstage fan in counterrotation relative to the main fan.

It is a more particular object of the present invention to provide a turbofan engine having improved fan and fan driving turbine efficiencies by the provision for a three-shaft engine with counterrotating compressor and turbine stages and a fan driven by the intermediate of the three shafts.

Stated briefly, the present invention accomplishes the foregoing objects by incorporating in a turbofan engine three spools comprising independently rotatable and coaxial shafts respectively carrying bladed stages forming statorless counterrotating compressor and turbine apparatus. Low pressure compressor stages are driven by and connected through the first shaft with low pressure turbine stages. Similarly, intermediate pressure compressor and turbine stages are interconnected through the second shaft; and high pressure compressor and turbine stages are connected through the third shaft. A bladed fan is carried by the intermediate shaft and rotates integrally with the intermediate pressure compressor stages. A quarterstage inlet fan is carried by the first shaft and rotates integrally with the low pressure compressor stages. Each bladed stage of the turbine, and substantially each compressor stage, is in counterrotation relative to each of its adjacent stages. Furthermore, each shaft is in counterrotation relative to adjacent shafts, and the main fan and quarterstage inlet fan are in counterrotation relative to one another.

Further objects and variations of the present invention will become apparent from the following description of a preferred embodiment thereof taken in combination with the drawings in which:

FIG. 1 is a partial section view of a turbofan engine according to the present invention; and FIG. 2 is a velocity diagram illustrating relative fluid and rotor stage velocities within the turbine of the present invention.

DESCRIPTION OF A PREFERRED EMBODIMENT

Referring to FIG. 1, the turbofan engine 10 includes a compressor section 12, a combustor 14 and a turbine section 16. An inner casing 18 circumscribes these main elements, and together with an outer casing 20 forms an annular duct or fan space 21. Outer casing 20 is held in place by a guide vane 22, extending across the annular duct 21. A bladed main fan 24, mounted for rotation as hereinafter described, extends substantially across the entire radial width of duct 21. A quarterstage inlet fan 26, mounted for rotation in a direction opposite that of fan 24, extends into the annular duct 21, and its blades are of such length that they extend across approximately one-half of the radial width of the duct, or some greater or lesser proportion chosen to enhance fan performance and to achieve torque balance.

In its operation, the turbofan engine of the present invention superficially resembles that of conventional turbofan engines. More particularly, an air stream entering the engine from the left in the drawing is, in part, pressurized by the quarterstage inlet fan 26, a first portion of the stream passing into duct 21 to be further pressurized by fan 24 and driven as a fan stream through the duct with increased momentum. A second portion of the air stream enters compressor 12 to provide a highly pressurized air stream for supporting the combustion of a preselected fuel in combustor 14. The working fluid stream (heated air and burned fuel) exiting from combustor 14 passes through the bladed stages of turbine 16 imparting momentum thereto. The turbine stages transform this momentum into torque for the operation of other rotating elements of the engine including the compressor stages. The working fluid stream exiting the turbine is rejoined with the fan stream and is exhausted through an appropriate nozzle providing thrust, additional to that produced by the fan discharge flow, the two flows being precombined and discharged through the nozzle or through separate nozzles, as the installation requires.

The particular cooperation among the respective rotating bladed stages of the turbine and of the compressor and the means by which fans 24 and 26 are driven represent substantial departures from the prior art, and are more particularly discussed hereinafter.

The present invention deals specifically with provisions for counterrotating turbine stages associated with counterrotating compressor stages and the arrangement of bladed fan elements, the desired result being that the engine is enabled to operate substantially in torque balance as between components rotating oppositely, and with individual elements operating near the modes of their peak efficiencies.

In the particular embodiment of the present invention depicted in FIG. 1, a ten-stage compressor is interconnected with a seven-stage turbing by means of three independently rotatable shafts. The main fan blades are mounted in cooperation with the intermediate of the three shafts, and a quarterstage inlet fan is mounted in cooperation with the innermost shaft.

Referring to the compressor 12 of FIG. 1, each blade depicted represents one of a plurality of blades spaced about the circumference of a plurality of substantially circular discs which make up the bladed stages of the compressor. The compressor may be divided into low, intermediate and high pressure segments. In the embodiment depicted, the low pressure compressor comprises bladed stage C1, the radially inner portion of the airfoil of the quarterstage inlet fan blade 26, and C3, the two rotating in unison. The intermediate pressure compressor includes bladed stages C2, C4 and C6. The high pressure compressor includes bladed stages C5, C7, C8, C9 (a stator), and C10, plus an exit straightening vane 62. During operation of the engine, an airstream entering compressor 12 from the left is serially engaged by the bladed stages C1 through C10. The airstream is incrementally pressurized by the engagement of each bladed stage as it passes through the compressor until a predetermined pressure is reached at stage C10, whereupon the airstream is directed into combustor 14. As has been stated above, the efficiency of an individual compressor and turbine stages is dependent, in part, upon the achievable blade speeds combined with the angles of attack between the fluid flow and associated blade stages. In compressors of the conventional rotor and stator variety, the relative velocity between the airstream and a given rotor stage is determined by the angular velocity of the rotor stage, the stator stage serving only to direct the airstream into an optimum angle of attack for engaging the blades of the rotor stage. Owing to the static character of the stator blades, an upper limit to relative velocity, and hence efficiency, between individual rotor stages and incident air is defined by centrifugal wheel speed limitations of the rotor stages and torque imbalance limits of the engine. The present invention, by removing stator stages and replacing them with counterrotating rotor stages greatly enhances this efficiency.

Referring now to the turbine portion 16 of the engine 10, in FIG. 1, each blade depicted represents a bladed stage of substantially circular configuration similar to the bladed stages of the compressor. In the embodiment depicted, the high pressure turbine includes bladed stages T1 and T3; the intermediate pressure turbine includes stages T2, T4 and T6; and the low pressure turbine includes bladed stages T5 and T7. In operation, the turbine serves to intercept the stream of gas (working fluid) exiting combustor 14 for the purpose of transforming a portion of the kinetic energy of the stream into torque for driving rotating elements of the engine including compressor stages. Turbine efficiency is a function of the relative velocity between the blades of a given rotor stage and the gas stream engaging that stage. Thus, the efficiency of a turbine stage is subject to the limitations of wheel speed centrifugal stress limits and for the case of this invention, is somewhat circumscribed by considerations of torque imbalance. The present invention serves to increase turbine efficiency while refraining from exceeding either of these limitations.

Before describing the particular operational characteristics of the compressor and turbine of the present invention, it is appropriate to describe the drive mechanisms linking the two. As was stated previously, the turbine serves to convert a portion of the kinetic energy of the hot gas stream exiting combustor 14 into torque for the driving of rotational elements. The engine according to the present invention is a three-spool configuration including three coaxial shafts 28, 30 and 32 mounted so as to be rotatable independently of one another. A static frame 34 affixed to inner casing 18 at the compressor discharge plane provides support for shaft 32 suspended therefrom by means of a thrust bearing 36 at the left end of the shaft, and a radial load unit 38 at the right end of the shaft. Intermediate shaft 30 is supported within shaft 32 by means of a differential thrust bearing 40 near the left end of shaft 30, and a differential radial load unit 42 at the right end of the shaft 30. The radially innermost shaft 28 is supported within shaft 30 by means of differential radial load unit 44 at its left end and thrust bearing 46 disposed at its right end and a static frame member 48. Innermost shaft 28 drives a bevel gear power takeoff unit 50 of the conventional variety disposed aft of bearing 46, if the engine driven accessories are required outboard of the aft centerbody fairing.

The interconnection between compressor and turbine stages will now be disclosed. As illustrated in the drawing, compressor stages C1 and C3 are interconnected at their discs by means of conical structural member 52. These stages are mutually supported and driven by conical portion 28a of shaft 28, the innermost of the three coaxial shafts. The opposite end of shaft 28 supports and is driven by turbine stages T5 and T7, which are mutually joined to shaft segment 28b of shaft 28. The blades of turbine stages T5 and T7 are arranged so that the gas stream engaging these stages will drive them and, hence, shaft 28 in the clockwise rotational direction. Thus, the low pressure compressor stages C1 and C3 will be driven in clockwise direction and at the same angular velocity as shaft 28 is driven by low pressure turbine stages T5 and T7.

Compressor stages C2 and C6 are interconnected and driven at their tip ends by means of a rotating casing 54 encircling a portion of the compressor and forming a radially inner portion of duct 21 upstream of the inner casing 18. Stage C4 is also interconnected with stages C2 and C6 and extends radially between rotating casing 54 and a fan disc 56, which drives bladed fan 24. The fan disc 56 is supported and driven by means of shaft 30. At the aft end of intermediate shaft 30 is disposed a shaft portion 30b which interconnects shaft 30 with the disc of bladed turbine stage T4. Bladed turbine stage T4 is interconnected with stages T2 and T6 by means of rotating shroud 58 affixed to the blade tips of these latter stages. The blades of turbine stages T2, T4 and T6 are arranged so that they are driven in a counterclockwise direction by the stream of gas exiting combustor 14. Thus, shaft 30 and intermediate compressor stages C2, C4 and C6, along with fan 24, are driven in a counterclockwise direction at an angular velocity determined by turbine stages T2, T4 and T6, the intermediate pressure turbine.

In a similar fashion, high pressure compressor stages C5, C7, C8 and C10 are interconnected at their discs and are joined to radially outer shaft 32 by shaft portion 32a. Turbine stages T1 and T3, the high pressure turbine, are interconnected at their discs and joined to shaft 32 by shaft portion 32b. The blades of turbine stages T1 and T3 are arranged in a manner appropriate to drive shaft 32 and its associated compressor stages C5, C7, C8 and C10 in the clockwise direction.

As a result, it may be observed that members of each pair of axially adjacent bladed stages of the turbine move relatively in counterrotation in response to the engagement of these stages by the gas stream exiting combustor 14. Also, shaft 30 rotates in the opposite direction from shafts 32 and 28. Consequently, the counterrotation is carried to the compressor, where substantially all adjacent stages operate in counterrotation relative to one another. Exceptions to counterrotation within the compressor include the adjacent stages C7 and C8 which rotate as members of a single disc, and stator C9 which does not rotate but rather is supported by means of brace 60 affixed to the fixed casing 18. Static exit straightening vanes 62 and turbine nozzle vanes 64 are respectively disposed at the inlet to combustor 14 and at the exit of the combustor and inlet to turbine 16.

The operation of the turbofan engine, according to the present invention, will now be described. In order to illustrate the benefits of the application of the counterrotation principles of the present invention within the turbine, FIG. 2 is included. This figure is a diagrammatic representation of relative fluid velocities and stage velocities existing within the turbine. Within this diagram, the U vectors represent the mean blade velocity of the corresponding bladed stage, while the V vectors represent relative velocities between fluid flow and blade stages. The subscript portions of the blade velocity designations and of the relative velocity designations refer to the individual bladed stages of the turbine, T1 through T7. It may be seen from the blade and shaft configurations of FIG. 1 that stage velocities UT1 and UT3 are equal, as are stage velocities UT2, UT4 and UT6 equal to one another and as are stage velocities UT5 and UT7, the foregoing groupings representing, respectively, the high pressure, intermediate pressure, and low pressure turbine stages. According to one object of the present invention, UT2, UT4 and UT6 (the mean velocities of the intermediate pressure turbine blades associated with shaft 30 by which fan 24 is driven) are substantially smaller in velocity than the velocities UT1 and UT3, and UT5 and UT7, associated with shafts 28 and 32.

Further representations in FIG. 2 include $V_i$ which represents the velocity of the working fluid approaching turbine nozzle vane 64, $E_g$ which represents the relative velocity of the fluid with respect to the inlet guide vane 64 as the fluid exits the guide vane; and $V_o$ which represents the fluid velocity exiting the turbine. Vectors VT1, VT2, VT3, etc., represent the approach velocity of incident working fluid relative to bladed stages T1, T2, T3, etc., respectively. Vectors ET1, ET2, ET3, etc., represent the exit velocity of the working fluid relative to bladed stages T1, T2, T3, etc.

In operation, working fluid exiting combustor 14 approaches inlet guide vane 64 at velocity $V_i$, and is deflected and accelerated by the nozzle vane into a new velocity represented by $E_g$, which is the velocity of the fluid relative to guide vane 64. As has been discussed above, a parameter of primary interest with respect to the efficiency of the turbine is the relative approach velocity of the fluid with respect to each bladed stage, and its relationship with the angle of attack between the stage and the fluid. To determine this velocity relative to stage T1, the mean rotatonal velocity UT1 of stage T1 is vectorially combined with $E_g$ in order to obtain vector VT1, the desired parameter. Thus, working fluid leaving the inlet guide vane at velocity $E_g$ approaches the first turbine stage T1 at relative velocity VT1. The fluid imparts a portion of its momentum to stage T1 and is accelerated by this stage into a particular exit velocity relative to stage T1 which is represented by vector ET1.

Subsequently, the fluid approaches bladed stage T2. In order to obtain a vector representation of the approach velocity of the fluid relative to stage T2, it is necessary to vectorially combine velocity ET1 with both the velocity of stage T1, (UT1) and the velocity of stage T2 (UT2). The result of this operation is vector VT2. Thus, the fluid approaches the second bladed stage T2 of the turbine at a relative velocity VT2, imparts a quantum of momentum to this bladed stage and leaves it at a relative velocity ET2. Similar vector operations yield representations of the approach and exit gas velocities relative to the remaining bladed stages of the turbine. The approach velocities represented by VT1, VT2, VT3, etc., approximate approach velocities which have been found to be most efficient for the operation of turbines. The vector diagram of FIG. 2 illustrates that these efficient velocities may be maintained in the counterrotating turbine of the present invention without the requirement for a plurality of stator vanes and in spite of the rotation of a number of interspersed stages at velocities so low as to be well adapted to drive a high bypass ratio fan, but without incurring the penalties of turbine performance heretofore associated with low blade speeds.

The working fluid stream continues through the turbine serially engaging the bladed stages and imparting momentum thereto. The momentum imparted to each bladed stage is carried to the torque transmitting shaft associated with that stage. The shafts 28, 30 and 32 carry the torque to their associated compressor stages for driving these stages in rotation; and shafts 28 and 30 additionally carry torque to the quarterstage inlet fan 26 and main fan 24, respectively. Thus, substantially all of the stages of the compressor counterrotate relative to adjacent stages. Additionally, fan 24 and quarterstage inlet fan 26 counterrotate relative to one another.

The counterrotation within the turbine permits fan 24 to be driven at a relatively low speed by shaft 30 cooperating with stages T2, T4 and T6 of the turbine without loss of turbine efficiency. Furthermore, the fan is driven in conjunction with a plurality of compressor stages, whose interspersion between counterrotating compressor stages operating at normal (higher) peripheral velocities allows these fan-associated compressor stages to recover a high pressure rise per stage without violation of normal diffusion parameters.

Other advantages accruing from the application of the present invention to turbofan engines include the virtual overall torque balance provided to the engine by the counterrotation of adjacent turbine and compressor stages, and of the quarterstage inlet and main fans. More particularly, the torque imparted to shaft 28 by turbine stages T5 and T7, and the torque applied in the same direction to shaft 32 by turbine stages T1 and T3 are necessarily balanced by the torque applied in the opposite direction to shaft 30 by turbine stages T2, T4 and T6. Similarly, torques applied in the counterclockwise direction upon shafts 28 and 32 by compressor stages C1, C3, C5, C7, C8 and C10 are necessarily substantially balanced by the torque applied in a clockwise direction upon shaft 30 by compressor stage C2, C4, C6 and the fan 24.

Since there are essentially no stator stages in the compressor and turbine, little torque is transmitted to the engine casing, and a total torque balance among rotating elements is inevitable. Fan 24 extends substantially aross duct 21, while fan 26 extends thereacross to a degree selected to provide a substantial torque balance between oppositely rotating components of the engine at a preselected rotary velocity of shaft 28. In this way, adjustment of the designed — length of the blades of fan 26 can be performed in order to achieve balance of torques at a shaft speed amenable to efficient compressor and turbine operation associated with other components. In the embodiment depicted in FIG. 1, the blades of fan 26 extend across approximately one-half the radial width of the duct; but, as stated, this length is subject to adjustments within various applications.

Moreover, centrifugal wheel speed limitations upon conventional engines are circumvented to a degree by the counterrotating principles of the present invention. More particularly, while a power output limitation arises in conventional rotor and stator engines at a particular level of power, corresponding to the maximum obtainable rotor velocities, this limiting power level may be increased without exceeding the limiting wheel speed levels by the application of counterrotation principles. This is true due to the increased pressure drop obtainable across individual stages of the turbine resulting from the added angular velocity (counterswirl) imparted to the stream by each preceding stage. Such counterswirl takes the place of the relative redirection performed by present stator stages and supplements it with countercurrent velocity.

This effect may be better understood with respect to compressors by the following hypothetical. Assuming that two adjacent counterrotating bladed stages of the compressor of the present invention are each operating at a peak attainable wheel speed, the relative velocity of the stream impinging the second or downstream stage is substantially higher than it would be were the upstream stage replaced by a stator. This may be visualized by bringing the upstream rotating stage to a halt to form a stator. In order to maintain the same relative velocity between the two stages, the downstream stage must be rotated at a velocity equaling the sum of its own velocity plus that of the upstream stage. It is at this latter total velocity that the downstream bladed stage of the turbine of the present invention is effectively engaged by the stream, and this velocity is clearly in excess of that attainable in conventional rotor and stator compressor arrangements.

Thus, it has been illustrated that the present invention offers improved efficiency in turbofan engines. The hypothetical case just presented indicates that the principles of the present invention make it suitable for use in a wide variety of gas turbine applications to propulsion and to power generation.

Recalling the arrangements for the mounting of the three shafts 28, 30 and 32, means for providing lubrication to the bearings supporting these shafts will now be described. Lubrication of the three static bearings 36, 38 and 46 is accomplished in a conventional manner and is not illustrated in detail. Similarly, the means for supplying fluid lubrication to the differential thrust bearing 40 and the differential radial load bearings 42 and 44 is conventional and not illustrated. However, the means for returning the lubricant from the differential bearings is simplified in the engine configuration described hereinafter.

As depicted in FIG. 1, shafts 30 and 32 are each formed of two conical sections, with the larger diameters of the cones meeting in a substantially circular joint near the axial center of each shaft. Thus, the axial center of each shaft is radially displaced from its respective ends. Consequently, liquid introduced near the ends of the shafts will tend to migrate to the axial center of that shaft under the influence of centrifugal force. The lubricant return mechanism of the present invention operates by making use of this principle.

Lubricant introduced into differential bearings 40, 42 and 44 is transmitted by appropriate means (not shown) to the inner surface of shafts 30 and 32, respectively. As these shafts rotate, the lubricant migrates toward the axial center of each shaft. Near the circular junction of the conical elements comprising shaft 30 is provided a plurality of radial apertures 66 through which the lubricant from shaft 30 is free to pass under the influence of centrifugal force onto the inner surface of shaft 32. A plurality of radial apertures 68 disposed near the circular junction of the conical elements of shaft 32 provides an exit passage for the lubricant migrating along shaft 32 from bearings 40 and 42 (as well as for the lubricant reaching shaft 32 through apertures 66). A substantially toroidal collector ring 70, statically supported from frame 34 by means of a strut 72 and substantially encircling shaft 32, receives the lubricant thrown through apertures 68. A conventional scavenge pump withdraws the lubricant from collector ring 70 and the lubricant return process is completed.

In addition to its inherent simplicity and consequent reliability, the lubricant return apparatus disclosed herein is particularly advantageous for separating air from the lubricant. During migration from the ends of shafts 30 and 32 toward apertures 66 and 68, the lubricant is forced into a thin film by the centrifugal force acting substantially perpendicularly to the inner surfaces of the shafts upon which the lubricant flow is formed. The lubricant is consequently separated radially from the less dense air associated with it, as the lubricant seeks its low energy state. In this manner, the substantially coaxial plural counterrotating shaft arrangement of the present invention provides additional benefits in conjunction with those already enumerated.

While the present invention has been described with reference to a preferred embodiment thereof, numerous variations may be made by those skilled in the art without departing from the essential spirit of the invention. For example, the number and disposition of counterrotating bladed stages of the turbine and compressor of a turbofan engine is not necessarily limited to those described and depicted. Furthermore, the principles of counterrotation described with respect to the turbine and compressor, and the interrelationship between them, is not necessarily limited to a turbofan engine, but finds equally advantageous application in turbojet engines as well as other types of gas turbine engines. Other variations will occur to those skilled in the art which do not depart from the inventive concepts described herein.

What is claimed as new and desired to be secured by Letters Patent of the United States is:

1. A gas turbine engine comprising:
    a compressor having bladed stages for pressurizing a flow of air;
    a combustor for receiving said pressurized air, for heating said air, and for ejecting said air in a stream;
    a turbine having bladed stages for producing torque from said stream;
    bearing means for rotatively supporting said compressor and said turbine;
    lubrication supply means supplying lubricant to said bearing means;
    first and second substantially coaxial rotatable shafts respectively interconnecting first and second stages of said turbine with first and second stages of said compressor, said bearing means rotatively supporting said first shaft at two spaced apart locations, said first shaft having the general shape of a pair of cones abutting in a substantially circular junction at their larger ends, said junction disposed intermediate said spaced apart locations, said first shaft further having a plurality of circumferentially spaced radial apertures disposed proximate said junction for the passage therethrough of fluid lubricant discharged by said bearing means at said two spaced apart locations from the radially inner surface of both cones of said first shaft; and
    a lubricant collector ring substantially encircling said first shaft proximate said junction for receiving and storing lubricant passing through said apertures as said first shaft rotates.

2. The gas turbine engine of claim 1 wherein said collector ring is substantially toroidal.

3. The gas turbine engine of claim 2 wherein said second shaft likewise has the general shape of a pair of abutting cones, and said second shaft has a plurality of circumferentially spaced radial holes disposed proximate the junction of said abutting cones for the passing therethrough of fluid lubricant from the radially inner surface of said second shaft.

4. The gas turbine engine of claim 3 wherein said second shaft is disposed within said first shaft, whereby fluid lubricant exiting said second shaft through said apertures therein is received by the radially inner surface of said first shaft.

* * * * *